United States Patent [19]
Florjancic

[11] 3,788,031
[45] Jan. 29, 1974

[54] DEVICE FOR THE FRAMING OF PHOTOGRAPHIC SLIDES

[76] Inventor: Peter Florjancic, St.-Martinstrasse 12, Garmisch-Partenkirchen, Germany

[22] Filed: Mar. 22, 1972

[21] Appl. No.: 236,899

[30] Foreign Application Priority Data
Mar. 26, 1971 Austria............................2625/71

[52] U.S. Cl.................................... 53/123, 53/252
[51] Int. Cl............................................. B65b 39/12
[58] Field of Search.............................. 53/123, 252

[56] References Cited
UNITED STATES PATENTS
3,009,300  11/1961  Johansson.......................... 53/252 X
2,892,295  6/1959  McArthur.............................. 53/123
3,457,697  7/1969  Engelstein.............................. 53/123

Primary Examiner—Travis S. McGehee
Attorney, Agent, or Firm—Kemon, Palmer & Estabrook

[57] ABSTRACT

A device for the automatic framing of photographic slides comprises a slide feed way pivoted at the inlet end to be vertically reciprocated by a control cam between a "feed position" in which the outlet end faces into a slide frame holder and a "retracted position" in which the outlet end is displaced perpendicularly to the slide feeding axis. A pusher is arranged to push a slide in the feed position into a frame in the frame holder and to return in the retracted position to behind the trailing edge of another slide located in the slide feed way. Slides are cut with a cutting knife from a photographic film strip as it is moved into the slide feed way by a slide feeder and the slide feeder and slide pusher are operatively connected to one another to work substantially simultaneously.

13 Claims, 7 Drawing Figures

PATENTED JAN 29 1974
3,788,031
SHEET 1 OF 2
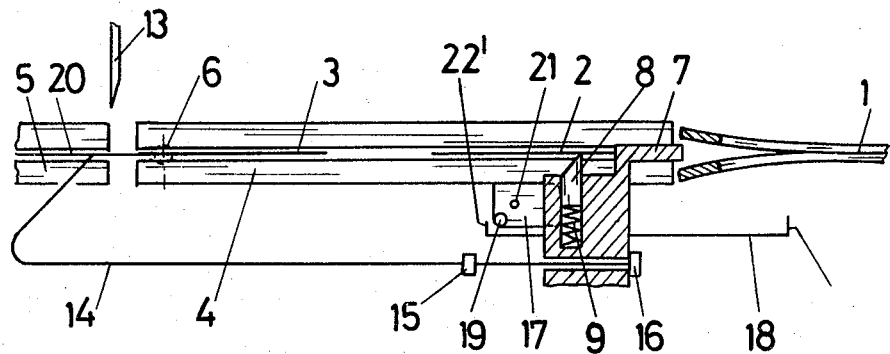
Fig. 1
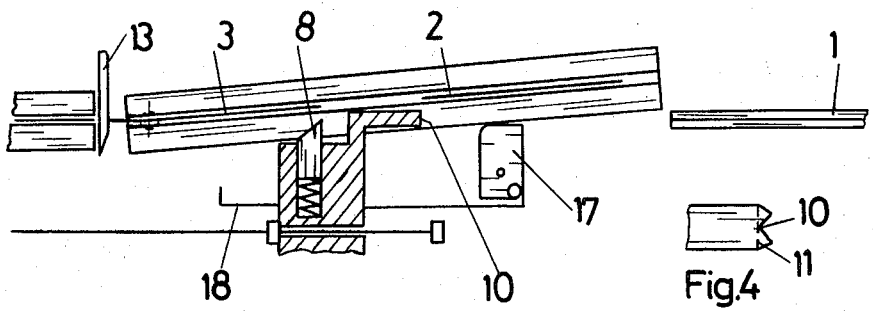
Fig. 2
Fig. 4
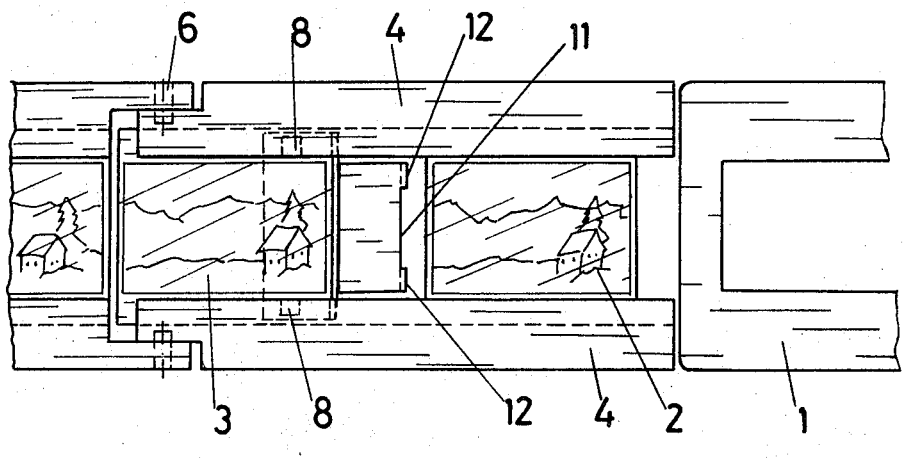
Fig. 3

DEVICE FOR THE FRAMING OF PHOTOGRAPHIC SLIDES

This invention relates to a device for the automatic framing of photographic slides, which are seized by a feeding device moving to and fro and are inserted up to their view-opening into pre-fabricated frames being open or being designed to be held apart at least at one side.

Usually these devices are fed by a strip of transparency film which then is cut off in the device into individual photographic slides which are inserted into the frames. The cutting off may be done before insertion into the frame which necessitates elements acting as feeding device which are complicated and frequently unreliable like suction cups, forceps or the like. It has also been known to insert the leading edge of the strip of transparency film into the frame about half the length of the photographic slide, to cut off only then the slide and to insert it completely. This procedure too requires relatively complicated mechanisms with cams, cranks, pincers and the like.

It is an object of the invention to provide a simple device with few moving parts which enables a high-speed framing without any hindrance. For this purpose the combination of the following two elements is proposed:

a. a movable slide feed way designed to receive at least one photographic slide each time, the end of the feed way being movable with respect to the feeding direction of the photographic slide in front of the opening of the frame ("feed position") or being slidable vertical to the feeding direction of said opening respectively ("retracted position") and b. a feeding device in the form of a push rod lying with its pushing edge behind the trailing edge of the photographic slide during the feed position of the slide feed way.

This embodiment enables on one hand to satisfactorily guide the slide also after cutting off i.e. in an essentially straight way and on the other hand insertion of the photographic slide into the frame may be effected by some simple element only moving to and fro in one direction.

The slide feed way being plane, at least during insertion, the photographic slide can take up longitudinal forces to such extent that it may hold apart by itself the opening of the frame with its leading edge so that spreading elements proper are superfluous.

As a matter of principle the slide feed way may be transversally movable in different ways. It can be movable as a whole transversally to the feeding direction or may be swung out about an axis arranged laterally and parallely to said slide feed way. As a matter of principle it would also be possible to construct said slide feed way flexibly, to attach it at its beginning and to bend it at its end in such manner that it moves out of the way of the push rod. An especially advantageous embodiment consists, however, in pivotally mounting the slide feed way about a pin arranged transversally to the feeding direction near the feed side of the way.

In a further embodiment of this construction, it is proposed to pivot the slide feed way by a square cam which cam, on its part, is reversed by dogs having a steering rod being tightly connected with the push rod.

The feed of the strip of transparency film suitably is done from a stationary film guideway, a periodically moved knife is provided between said film guideway and the movable slide feed way, said knife cutting off one slide each which already is positioned in the slide feed way. The gradual forward movement of the strip of transparency film may be effected in a simple way according to the invention by means of a pull rod engaging at its end into the perforations of the strip of transparency film. The pull rod may be moved by the push rod; a dead travel has only to be provided, as the stroke of the pull rod has to be equal to the length of the photographic slide, while the stroke of the push rod has to be greater by the length of the slide as appears more clearly in the following disclosure.

An embodiment of the invention is hereinafter described in detail with reference to the drawings, the invention, however, not being limited thereto and the reference numerals having only explanatory character.

FIG. 1 is a very diagrammatic section of a device according to the invention in "feed position,"

FIG. 2 is the same section in "retracted position,"

FIG. 3 is a top plan view to FIG. 2

FIG. 4 is a detail,

Figure 5:
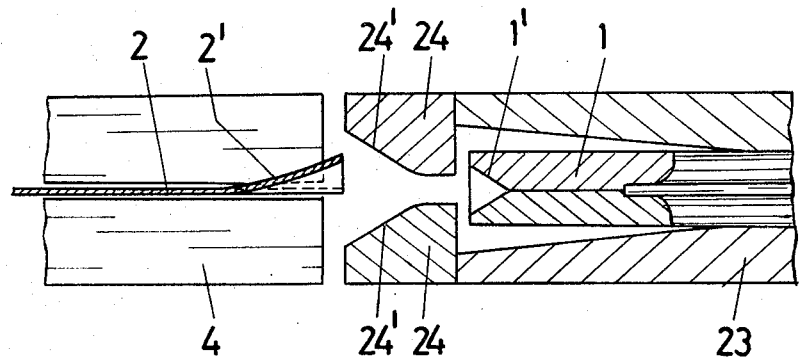
FIGS. 5–7 are a somewhat modified embodiment of the invention.

The uncut film 20 is fed to a stationary film guideway 5 by means of a roller not shown in the drawings; said roller essentially comprises two ledgers provided with one lateral slit each and the strip of photographic film only glides in the region of its perforations in the slits while the picture itself remains visible and therefor cannot be scratched.

At the end of the film guideway 5 a cutting knife 13 is arranged, which separates the photogrpahic slide 3 —being already positioned in the slide feed way 4— from the strip of transparency film.

The slide feed way 4 essentially is constructed like the stationary film guideway 5 but is pivotally mounted by means of two pins 6. In "feed position" (FIG. 1) its front end is positioned in front of the opening of frame 1 designed to be held apart so that the leading edge of the photographic slide 2 hits exactly the junction plane of the frame.

The photographic slide 2 is pushed forward by a push rod 7 which is moved to and fro by a mechanism not shown. Upon, the forward movement the pushing edge 10 of the push rod thereby is positioned behind the trailing edge of the photographic slide 2 and presses the latter into the frame 1. During the retracting movement the slide feed way 4 is lifted allowing the push rod 7 to move back under the following photographic slide.

The lifting of the slide feed way 4 is accomplished by a square cam 17 being rotatably mounted about a pin 21. The cam itself is reversed each time in the final positions of push rod 7 by two limit dogs 22', 22" of a steering rod 18 being tightly connected with the push rod 7 whereby the limit dogs 22', 22" butt against a roller 19 mounted at the cam 17. Due to the small distance between the roller 19 and pin, 21 the reversing is effected within the smallest stroke. The construction of the cam in the form of a square results in an automatic and safe fixation in the final positions without using any additional elements.

The slide feed way 4 is long enough that it may receive two photographic slides one behind the other. While the front slide 2 is pressed into the frame by push rod 7, a gripper 8 mounted at the push rod 7 and pressed against the slide 3 by a spring 9 engages into the perforations of the slide and pulls it up to the point where it may be seized by the push rod 7 at its trailing edge with the subsequent stroke.

In order to pull the leading end of the strip of transparency film 20 into the slide feed way 4, a pull rod 14 is slidably attached in one of the bores of the push rod 7 and engages within the stationary guideway 5 with its bent-up end into the perforations of the strip of photographic film 20. A fixed dog 15 and an adjustable dog 16 are mounted on the pull rod 14, said adjustable dog 16 enabling a readjustment of the position of the cutting. It is a particular advantage of the device that the photographic slides 2, 3 may be observed during their stay in the slide feed way whereby the position of the cutting may be particularly controlled.

As illustrated in FIGS. 3 and 4, the pushing edge 10 has a mid-portion 11 in the form of a smooth surface, while its borders have the form of a groove 12 with inclined lateral faces. The result of this special consturction is that even bent photographic slides may be safely seized, the grooves thus having a stretching effect; a sliding off not being possible owing to the lateral grooves while with continuous grooves there would be the risk that a more bent photographic slide would butt against one of the projecting groove-ends in the mid-portion.

Figure 6:
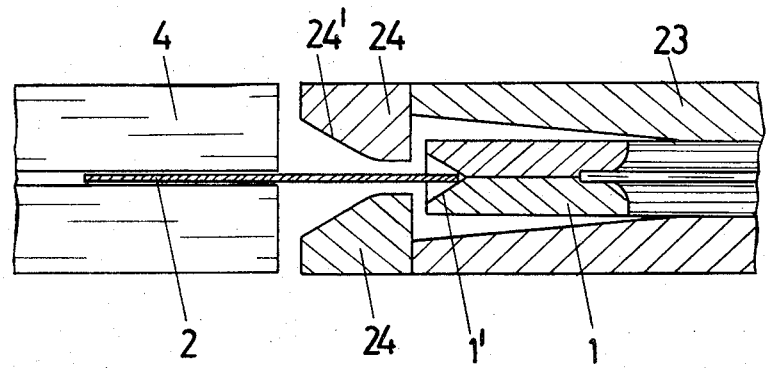
Figure 7:
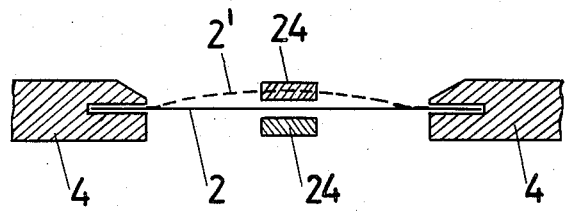

FIGS. 5-7 illustrate how a safe inserting of the leading edge of the slide 2 into the frame is obtained with a somewhat modified embodiment, even if the slide should adopt the more bent shape 2'. The frame itself is provided with slopes 1' at its feed side which facilitate owing to their funnel effect insertion of the slide. This construction of the photographic slide however is not subject of the present application. Two guide pieces 24 are mounted at the holder 23 for the slide 1, which guide pieces bend a slide 2', possibly being more bowed, in its center into the plane of the feed opening. As a matter of principle this would be possible in that both guide pieces are moved towards each other in the sequence of the feeding in that moment when the leading edge of the slide 2 reaches their region. The same effect, however, may be produced in some simpler way in that the guide pieces 24 are provided with one slope 24' each. A scratching of the slide cannot occur for the reason that first of all only the edge of the photographic slide slides along the respective surface while in the further course of the movement the slide is stretched by the frame and therefor no longer butts against the guide pieces. The risk of scratching may further be reduced in that the gliding surfaces of the guide pieces are hardened, chromium plated or the like as well as polished; by the latter procedure the surfaces cannot be scratched while the particular hardness prevents introducing of particles of sand or the like into the surface, which particles would grate along the photographic slide.

I claim:

1. A device for inserting a photographic slide into a prefabricated frame which comprises:
    a holder for said frame,
    a slide feed way to slidably receive at least one photographic slide, said slide feed way having an inlet end and an outlet end,
    means to move said outlet end of said slide feed way alternatively into a first position in which said outlet end faces the edge slit of said frame and a second position in which said outlet end is displaced perpendicularly of the photographic slide inserting axis away from said edge slit,
    a slide pusher having a pushing edge, said pusher being arranged to reciprocate to place said pushing edge behind the trailing end of a photographic slide in said slide feed way when the slide feed way is in said second position, and to move said pushing edge adjacent said edge slit when the slide feed way is in said first position, and
    slide feed means for moving a photographic slide into said slide feed way,
    said slide pusher and slide feed means being operatively connected to one another to work substantially simultaneously.

2. A device as claimed in claim 1 which includes a stationary film guideway having an outlet end, said guideway being positioned adjacent said slide feed way so the outlet end of the guideway faces the inlet end of the feed way when the feed way is in said first position with a small opening between said inlet end and said outlet end of said guideway.

3. A device as claimed in claim 2 having a cutting knife, the cutting edge of which in the sequence of operation of the device will enter said opening between said outlet end and said inlet end to cut film within said opening.

4. A device as claimed in claim 1 wherein said slide feed way is pivoted at the inlet end upon pins arranged transversally of the longitudinal axis of the slide feed way.

5. A device as claimed in claim 4 wherein said slide feed way is caused to move about said pivot pins between a feed position and a retracted position by a control cam located beneath the slide feed way.

6. A device as claimed in claim 5 wherein said slide pusher carries a steering rod having a limit dog at each end and said cam carries a roller dog which contacts said limit dogs for movement of said control cam.

7. A device as clamed in claim 1 wherein said slide feed way is at least equal to the length of two photographic slides.

8. A device as claimed in claim 1 wherein said slide feed means comprises a push rod which is reciprocated by said slide pusher and at least one slide gripper carried by said push rod, which gripper engages in the feed position perforations in photographic film that is processed in said device.

9. A device as claimed in claim 8 wherein a pull rod is arranged at the push rod, whose end lies in the perforations at the position of the film lying in the film guideway to said slide feed means.

10. A device as claimed in claim 9, characterized in that the pull rod is arranged longitudinally slidable in a bore of the push rod and bears two dogs, one of which is adjustable and the inside distance between the dogs is at least approximately equal to the length of the bore in the push rod and to the length of the one part of the push rod lying behind the photographic slide.

11. A device as claimed in claim 10, characterized in that the borders of the pushing edge of the push rod have the form of a groove, whose lateral faces transversally run towards each other, while the mid-portion lying between the grooves is put back at least up to approximately the prolongation of the bottoms of the grooves.

12. A device as claimed in claim 11, characterized in that two guide pieces are arranged between the opening of a holder receiving a frame for a photographic slide and the end of the slide feed way, said guide pieces leaving between them a gap greater than the thickness of the photographic slide and smaller than the thickness of the frame.

13. A device as cliamed in claim 12, characterized in that the edges of the guide pieces pointing against one another are chamfered so that the gap narrows in feeding direction of the photographic slide.

* * * * *